US008965846B2

(12) United States Patent
Ziemann et al.

(10) Patent No.: US 8,965,846 B2
(45) Date of Patent: *Feb. 24, 2015

(54) METHODS AND SYSTEMS FOR SYNCHRONIZING DATA IN A MULTI-TENANT DATABASE ENVIRONMENT

(71) Applicant: salesforce.com, Inc., San Francisco, CA (US)

(72) Inventors: Tyler Ziemann, San Francisco, CA (US); James Hang, San Francisco, CA (US); Susan S. Levine, Walnut Creek, CA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/034,796

(22) Filed: Sep. 24, 2013

(65) Prior Publication Data

US 2014/0032492 A1   Jan. 30, 2014

Related U.S. Application Data

(63) Continuation of application No. 13/118,539, filed on May 30, 2011, now Pat. No. 8,572,029.

(60) Provisional application No. 61/349,991, filed on May 31, 2010.

(51) Int. Cl.
   G06F 17/30   (2006.01)
(52) U.S. Cl.
   CPC ................... *G06F 17/30575* (2013.01)
   USPC ........................................................ 707/610

(58) Field of Classification Search
   None
   See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |

(Continued)

*Primary Examiner* — Wilson Lee
(74) *Attorney, Agent, or Firm* — Blakely, Sokoloff, Taylor & Zafman

(57) ABSTRACT

In accordance with embodiments, there are provided mechanisms and methods for synchronizing data in a database network system. These mechanisms and methods for synchronizing data in database network system can enable embodiments to provide users a synchronization button on a UI or synchronization field through an API for specifying data for synchronization. The ability of embodiments to provide users a synchronization button on a UI or synchronization field through an API for specifying data for synchronization can enable users to easily and efficiently change and update data in a database system.

20 Claims, 10 Drawing Sheets

(56) References Cited

U.S. PATENT DOCUMENTS

| | | |
|---|---|---|
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,340,411 B2 | 3/2008 | Cook |
| 7,620,655 B2 | 11/2009 | Larsson et al. |
| 2001/0044791 A1 | 11/2001 | Richter et al. |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0152102 A1 | 10/2002 | Brodersen et al. |
| 2002/0161734 A1 | 10/2002 | Stauber et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachadran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0088545 A1 | 5/2003 | Subramaniam et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0191743 A1 | 10/2003 | Brodersen et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |

METHODS AND SYSTEMS FOR SYNCHRONIZING DATA IN A MULTI-TENANT DATABASE ENVIRONMENT

CLAIM OF PRIORITY

This application is a continuation of U.S. patent application Ser. No. 13/118,539, titled "METHODS AND SYSTEMS FOR SYNCHRONIZING DATA IN A MULTI-TENANT DATABASE ENVIRONMENT," by Tyler Ziemann, et al., filed May 30, 2011; which claims the benefit of U.S. Provisional Patent Application 61/349,991 entitled "METHODS AND SYSTEMS FOR SYNCHRONIZING DATA IN A MULTI-TENANT DATABSE ENVIRONMENT," by Tyler Ziemann et al., filed May 31, 2010, and the contents of all the applications listed above are incorporated herein, by reference, in their entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS REFERENCE TO RELATED APPLICATIONS

The following commonly owned, co-pending or other U.S. Patents and Patent Applications, including the present application, are related to each other. Each of the other patents/applications listed below are incorporated by reference herein in its entirety:

U.S. Provisional Patent Application 61/349,991 entitled "METHODS AND SYSTEMS FOR SYNCHRONIZING DATA IN A MULTI-TENANT DATABASE ENVIRONMENT," by Tyler Ziemann et al., filed May 31, 2010; and U.S. patent application Ser. No. 13/118,539, titled, "METHODS AND SYSTEMS FOR SYNCHRONIZING DATA IN A MULTI-TENANT DATABASE ENVIRONMENT," by Tyler Ziemann et al., filed May 30, 2011.

FIELD OF THE INVENTION

One or more implementations relate generally to synchronizing data in a database network system.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

In conventional sales environments, sales personnel use a variety of techniques to keep track of customer and/or business information. One way sales personnel organize and keep track of customer and/or business information is to store the information on an electronic database. The stored customer and/or business information may include, for example, general customer and/or company information, customer contact information, potential business opportunity information, information regarding quoted product pricing, a list of pricing of various products offered to the customer, etc. Some of the stored customer and/or business information may be duplicated in different portions of an electronic database.

Unfortunately, synchronizing specific portions of business information associated with a customer and/or business may conflict with existing database logic. Triggers and other database logic may result in infinite loop issues when synchronizing portions of business information on a database.

Accordingly, it may be desirable to provide techniques enabling data synchronization in the database system to improve user efficiency of the database system.

BRIEF SUMMARY

In accordance with embodiments, there are provided mechanisms and methods for synchronizing data in a database network system. These mechanisms and methods for synchronizing data in database network system can enable embodiments to provide users a synchronization function, such as by providing a button on a User Interface (UI) or may provide a synchronization field through an Application Program Interface (API) for specifying data for synchronization. The ability of embodiments to provide users a synchronization function can enable users to easily and efficiently change and update data in a database system.

In an embodiment, users may synchronize quote information with parent opportunity information by selecting a start synchronization button through a user interface (UI) or by setting a SyncedQuote field on the parent opportunity through an application programming interface (API). In an embodiment, during the synchronization of a quote with its parent opportunity, quote line items may be copied to the parent opportunity as opportunity line items. In an embodiment, the synchronization may be accomplished by running a series of operations to delete, update, and insert opportunity line items to match the line items of the quote.

In an embodiment, the price book of the opportunity may also be synchronized with the price book of the quote. In an embodiment, detection and prevention of infinite loops as a result of synchronizing quote information with parent opportunity information may be performed by employing a Boolean roll-backable variable. The Boolean roll-backable variable indicates when an object is currently being synced. In an embodiment, if the Boolean roll-backable variable is set, a synced object cannot be synced again in the same transaction, resulting in throwing an exception to avoid infinite loops, and doing an attempted synchronization.

While one or more implementations and techniques are described with reference to an embodiment in which techniques for synchronizing data in a database network system are implemented in a system having an application server providing a front end for an on-demand database service capable of supporting multiple tenants, the present invention is not limited to multi-tenant databases nor deployment on application servers. Embodiments may be practiced using other database architectures, i.e., ORACLE®, DB2®, by IBM® and the like without departing from the scope of the embodiments claimed.

Any of the above embodiments may be used alone or together with one another in any combination. Inventions encompassed within this specification may also include embodiments that are only partially mentioned or alluded to or are not mentioned or alluded to at all in this brief summary or in the abstract. Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

In the following drawings like reference numbers are used to refer to like elements. Although the following figures depict various examples of the invention, the invention is not limited to the examples depicted in the figures.

DETAILED DESCRIPTION

Figure 1:
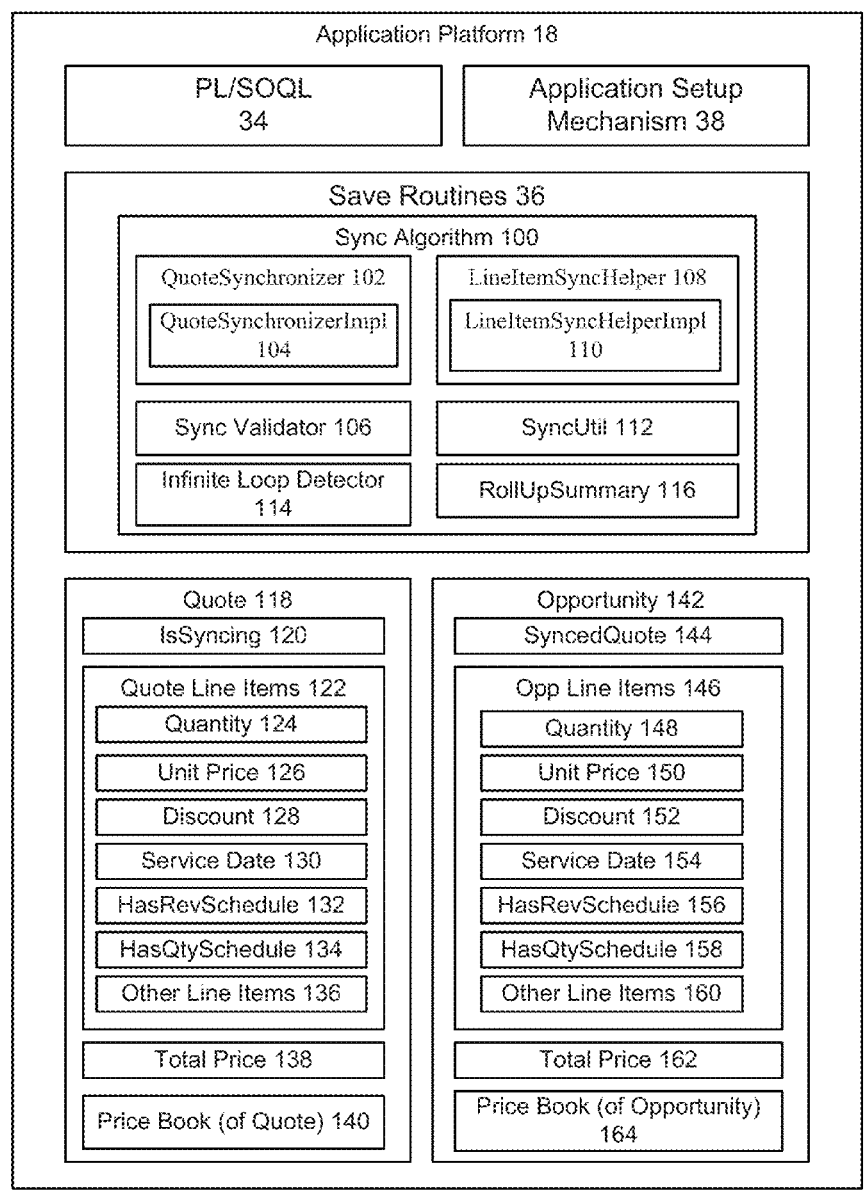
FIG. 1 illustrates a block diagram of an embodiment of an application platform for providing data synchronization in a multi-tenant database environment.

Systems and methods are provided for synchronizing data in a database network system. As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query plan refers to a set of steps used to access information in a database system.

Next, mechanisms and methods for providing data synchronization in a database network system will be described with reference to example embodiments.

Data Synchronization

Sales personnel need the ability to efficiently organize and track customer and sales data. One method of organizing and tracking customer and sales data is entering and storing the data in an electronic database. Sales personnel may enter and store a variety of customer data such as company name, contact numbers, prior sales history, etc. Sales personnel may also need the ability to enter and store data related to potential customers and potential sales.

In this application, an opportunity refers to stored information, stored in a machine readable medium (e.g., a computer readable medium), about a potential customer, potential sale, or other potential business arrangement that a company may store. For example, personnel, such as sales personnel may be aware of opportunity information, which may be entered into the portion of a database that is reserved for the company as a result of being a tenant in a multitenant database. An opportunity may have many types of data associated with it. For example, an opportunity may have associated data representing a date of first contact by sales personnel or date that sales personnel first became aware of the opportunity. An opportunity may also have associated data about what products and quantities of products might be sold and at what price. An opportunity may include a price book. A price book may be a list of all or some of the products offered by sales personnel to a potential customer and prices for the offered products. Different potential customers may be offered different price books. For example, a large corporation may be offered a price book reflecting discounted pricing due to the potential for large orders requiring a greater quantity of products. Alternatively, a small company may be offered a price book reflecting higher pricing due to the smaller quantities of product required. Even if all customers are offered the same prices, the prices may change with time, and as a consequence different quotes may be associated with different price books, depending on when the quote was offered.

A quote may be associated with an opportunity. A quote may include a price and/or quantity stated to a potential customer that a salesperson may reference at a later date. For example, from a given opportunity, sales personnel may contact a potential customer associated with the opportunity. The potential customer may request a quote for pricing information based on various desired quantities of a product. At a later date, the potential customer may contact sales personnel referencing the previously supplied pricing information to close a deal. The opportunity from which the quote originated from may be referred to as a parent opportunity of the quote. In an embodiment the opportunity is associated with a price book, and the quote is only associated with a price book as a result of the opportunity being associated with the price book. Optionally, a quote may also be associated with a price book, which may be stored in association with the quote. For example, a webpage having fields that display and/or for entering information about the opportunity and/or quote may have a link, which when activated causes the price book to be displayed. The ability to rely on previously quoted information may facilitate the customer in making business decisions, and may save the sales person from embarrassing moments in which the sales person inadvertently quotes a different price than quoted in a previous encounter.

With a large number of opportunities, quotes, and related data stored on an electronic database, keeping all the data organized and consistent can become a challenge when changes are made to portions of data affecting other associated and/or related data. For example, sales personnel may need to provide a revised quote to a potential customer or the sales representative may give several different quotes to the same customer, which depend on which features the user desires. Once the customer selects an option and a final quote is accepted the opportunity may need to be synchronized with the final quote. A revised quote may necessitate editing the quote data and in an embodiment may in some cases also necessitate editing the price book data (e.g., by changing the pricebook) and opportunity data associated with the quote. Keeping quote data and opportunity data in synchronization may be necessary in order to provide consistent information. By providing a method for initially synchronizing data as well as ongoing data synchronization in the electronic database, editing and/or revising associated information and/or data is simplified and kept accurate in an efficient manner.

FIG. 1 illustrates a block diagram of an embodiment of an application platform 18 for providing data synchronization in a multi-tenant database environment. Application platform 18 may include PL/SOQL 34, application setup mechanism 38, save routines 36, synchronization algorithm 100, QuoteSynchronizer 102, QuoteSynchronizerImpl 104, Synchronization Validator 106, LineItemSyncHelper 108, LineItemSyncHelperImpl 110, syncUtil 112, infinite loop detector 114, RollupSummary 116, Quote 118, IsSynching 120, QuoteLineItems 122, Quantity 124, Unit Price 126, Discount 128, Service Date 130, HasRevSchedule 132, HasQtySchedule 134, Other line items 136, and Total Quote Price 138, and price book (of Quote) 140. Application platform 18 may further include Opportunity 142, SyncedQuote 144, OppLineItems 146, Quantity 148, Unit Price 150, Discount 152, Service Date 154, HasRevSchedule 156, HasQtySchedule 158, Other line items 160, Total Opportunity Price 162, and price book (of Opportunity) 164. In other embodiments, application platform 18 may not have all of the elements listed and/or may have other elements instead of, or in addition to, those listed.

Application platform 18 may be a framework that allows the execution of applications on a system, e.g., an operating system. PL/SOQL 34 may provide a programming language style interface extension for invocations to developer applications. Application setup mechanism 38 may be used to setup and support the creation and management of developer applications. Save routines 36 may be used to save developer applications created for application platform 18. Save routines 36 may include hooks that are activated by a call to a save routine, where the hooks are for synchronizing opportunities with quotes and/or for checking that the opportunities and quotes have been properly synchronized with one another. Application platform 18, PL/SOQL 34, save routines 36, and application setup mechanism 38 will be further described below in conjunction with a description of the environment where they may be used.

Synchronization algorithm 100 may be instructions for the synchronization of data. It should be understood the word "instruction" may be used interchangeably herein with the words "code" and "function." In an embodiment, synchronization algorithm 100 may be composed and organized into subsets or classes of instructions for handling data synchronization tasks. For example, synchronization algorithm 100 may be organized into subsets of instructions, each subset of instructions intended to perform specified tasks such as synchronizing data, validating synchronized data, detecting infinite loops, specifying data sets for synchronization, etc. QuoteSynchronizer 102 may be one or more functions used for synchronizing opportunity and quote data. In an embodiment, QuoteSynchronizer 102 may be used as part of an API or other interface for defining the methods used for performing synchronization of quote and opportunity data. In an embodiment, QuoteSynchronizer 102 may be used for performing both the initial synchronization of a quote and opportunity data, as well as the ongoing synchronization of the quote and opportunity data.

QuoteSynchronizerImpl 104 may be the implementation of the quote synchronization functions of QuoteSynchronizer 102 used for performing synchronization of quote and opportunity data. In an embodiment, the QuoteSynchronizerImpl 104 class cannot be instantiated directly by the user. In an embodiment, a public static get ( ) method may be called by QuoteSynchronizer 102, which returns a main implementation class of the quote or a disabled version of the main implementation class of the quote for the returned quotes that are disabled. In an embodiment, a main implementation class may be structured data associated with the quote. During a synchronization of an opportunity in response to recent changes in a quote, line items in the opportunity are found that correspond to line items in the quote that were changed, and each line item is updated. The updating may occur by creating a line item for the opportunity with the new information, deleting the original line item, and replacing the original line item with the newly created line item. Alternatively, the values in individual fields in the line item may be deleted and replaced with the new values of the quote. Synchronization Validator 106 may be one or more functions used to verify whether data synchronization was executed properly. For example, in an embodiment, Synchronization Validator 106 may execute at the end of a transaction to validate whether synchronized opportunity data properly corresponds to related quote data before allowing a commit to execute. If not all line items have been synchronized, the line items not yet synchronized, may then be synchronized, prior to committing a change to the quote.

LineItemSyncHelper 108 may be one or more functions for synchronizing line items. In an embodiment, a line item may be data associated with a quote or opportunity. More specifically, a line item may be data representing a product or service offered to a customer, stored as a record in a database. In an embodiment, a line item may belong to an opportunity or a quote. A line item may have additional associated data such as the unit price of each product or service, quantity of each product or service, the discount given, etc. LineItemSyncHelper 108 may be used for ongoing synchronization of the individual line items of a quote with its parent opportunity. For example, if the unit price line item of a quote has a value of five dollars and is synchronized with its parent opportunity unit price line item, if the quote unit price line item is revised to six dollars, the value of the opportunity unit price line item is also revised to six dollars. LineItemSyncHelper 108 functions for ongoing synchronization may also be used for synchronizing line items during initial synchronization. In an embodiment, to ensure that every line item is synchronized, there may be a function (which may have a name such as LineItemSyncHelper.checkLineItemsAreSyncing) that checks that all of the line items (e.g., line item by line item) have been synchronized when a quote 118 and an opportunity 142 have been designated as requiring synchronization with one another. In an embodiment, the function that checks that each line item is synchronized performs a check that each line item is synchronized that is separate from the check that each line item is synchronized that is performed by synchronization validator 106.

LineItemSyncHelperImpl 110 may be the implementation of the line item synchronization functions used for performing synchronization of quote line item and opportunity line item data. In an embodiment, the LineItemSyncHelperImpl 110 class cannot be instantiated directly by the user. In an embodiment, a public static get ( )method may be called by LineItemSyncHelper 108 which returns a main implementation class or a disabled version if returned quotes are disabled.

SyncUtil 112 may include methods, functions, and logic being performed in different places consolidated into one convenient location. For example, SyncUtil 112 may contain static methods for common functions and logic used for data synchronization. Infinite loop detector 114 may be one or more functions for verifying triggers for performing data synchronization do not point to each other resulting in repeating synchronization cycles. RollupSummary 116 may be one or more functions used for calculating values from a set of related records summarizing the content of those records (e.g., as a minimum value, maximum value, total, and/or average). For example, RollupSummary 116 may be used to calculate the total sum pricing of all products that a customer may be potentially interested in purchasing given as part of a quote. RollupSummary 116 may also be used to determine the highest and lowest value from a set of related records and/or count the number of records.

Quote 118 may be a database table that represents reference pricing and quantity information given by sales personnel to a customer. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. In an embodiment, quote 118 may be representative of a database table, the database table having multiple records, the fields of each record may be line items representing and/or associated with various types of information given by sales personnel to potential customers. For example, each record may contain multiple columns of the database table and each column may represent different types of quote data such as product types, product quantity, unit price, customer contact date, etc.

IsSyncing 120 may be a Boolean field of Quote 118. In an embodiment, IsSyncing 120 may be a flag indicating whether data is currently being synchronized or has been synchronized. In an embodiment, IsSyncing 120 may contain a Boolean value of TRUE or FALSE. In order to "mark" a quote as currently being synchronized, the IsSyncing Boolean field or flag may be added to the quote object. In an embodiment, the IsSyncing 120 Boolean field may be set to TRUE when a quote is initially synchronized with an opportunity. If the data is not currently being synchronized, then the IsSyncing 120 flag may be set to FALSE. In an embodiment, if it is desirable to synchronize a particular quote with an object (which may have the name Opportunity.SyncedQuote) a pointer pointing to the Quote may be added. In an embodiment, when IsSyncing 120 is set to true (so that IsSyncing=TRUE), a pointer is added to Opportunity.SyncedQuote pointing to the quote to indicate to synchronize the quote.

Optionally, IsSyncing 120 may be used to prevent infinite loops, by checking whether IsSyncing 120 is set to TRUE prior to performing synchronization. If upon checking, prior to performing a synchronization, it is determined that IsSyncing 120 is set to TRUE, then the synchronization is not performed, because a synchronization is already in progress and allowing the synchronization to be performed may lead to an infinite loop. If upon checking, prior to performing synchronization, that IsSyncing 120 is FALSE, then the synchronization is performed, because no other synchronization is being performed and consequently there is little danger of causing an infinite loop. Additionally, after determining that IsSyncing 120 is FALSE (as a result of checking the value of IsSyncing 120 just prior to performing synchronization), IsSyncing 120 is set to TRUE while the synchronization is being performed.

Quote Line Items 122 may be objects representative of certain information given to a potential customer when providing a quote. Quote Line Items 122 may represent products and/or services a customer is interested in purchasing. In an embodiment, a Quote 118 may have multiple Quote Line Items 122. In an embodiment Quote Line Items 122 may contain data about products and/or services including quantity 124, unit price 126, discount 128, and service date 130, and Quote Line Items 122 may be associated with HasRevSchedule 132, and HasQtySchedule 134. It should be understood the use of the term "quote line item" may refer to Quote Line Items 122 and/or to the data contained in Quote Line Items 122, such as Quantity 124, unit price 126, discount 128, and service date 130.

Quantity 124 may represent the number of units of a product or length of services that a customer is interested in purchasing. Unit price 126 may represent the cost for a unit of a product, such as the cost of a piece of a product or an hourly cost of a service that a customer is interested in purchasing. Discount 128 may represent the markdown that a customer can expect to receive from the list price for a product or service. For example, a customer may receive a greater discount for ordering a product in large quantities and/or at regular intervals. Service date 130 may represent the date a quote was provided to a customer. HasRevSchedule 132 may be a variable that indicates whether the opportunity for the quote has a revenue schedule. The revenue represents the expected revenue from the sale of a product based on a predetermined delivery schedule. For example, the revenue schedule may include the dollar amount expected from the monthly delivery of a particular subscription service. In an embodiment, if the quote or opportunity has a revenue schedule, the system may prevent the updating of the total price and quantity of the quote. HasQtySchedule 134 may be a variable that indicates whether a quantity schedule was created for the quote. The quantity schedule represents the quantity of one or more products a customer is scheduled to receive at regular intervals. For example, an individual may have a subscription service for monthly wine deliveries. The quantity schedule may represent the number of bottles a customer would receive the first of each month. In an embodiment, the user has the option of changing the quantity, and updating the unit price to keep the total price the same or of keeping the unit price the same and updating the total price to reflect the change in quantity. Other line items 136 may represent other data associated with quote line items 122 but which are not kept in synchronization with related parent opportunity line items.

Total price 138 may represent the sum of the cost of all products and/or services related to the quote provided to a customer. Total price 138 may be calculated using RollupSummary 116 to sum the cost of all products and/or services that are part of the quote. Price book 140 contains the list of products and/or services and fees for a variety of products and/or services offered by the tenant. A company may choose to keep multiple price books to better organize their products and services. Different divisions of a company may have price books containing the same products and/or services but at different prices. In an embodiment, a quote 118 can have a given quote line item 122 only if the quote 118 has a price book. In an embodiment, a given quote line item 122 must correspond to a product (or service) that is listed in price book 140.

Opportunity 142 may be a database object that represents information related to potential deals. Opportunity 142 may include potential deal information, such as total deal value, other competing suppliers, what stage the deal is in, etc. Opportunity 142 may also include similar and/or related data as quote 118. For example, Opportunity 142 may contain line items that represent data that is similar to the opportunity data, such as product and service types, product and service quantity, discount, unit price, etc.

SyncedQuote 144 indicates which particular quote 118 an opportunity 142 is being synchronized with. To allow performing initial synchronization through an API, a lookup field called "SyncedQuote" may be added to Opportunity 142. In an embodiment, setting SyncedQuote 144 field to a different quote would synchronize an opportunity 142 with the quote 118 indicated in the SyncedQuote 144 field. If the opportunity 142 was already synchronizing with another quote 118, the opportunity 142 would unsynchronize with the quote 118 first.

An opportunity 142 may have multiple quotes 118 associated with the opportunity 142. For example, from a given opportunity 142, multiple packages may have been offered to a potential client, so that the client may assess, which package best suits their needs. A given item may be priced differently in different packages/quotes. For example, in one quote the potential customer may be offered a volume discount for the item that is not available in another quote based on purchasing a larger number of that item than would be purchased in the other quote. In an embodiment, a particular organization may require opportunity 142 to reach a particular stage prior to sending a quote 118 to a customer. In an embodiment, SyncedQuote 144 may allow a user to determine which quote 118 an opportunity 142 is synchronized with.

Opportunity Line Items 146, which may also be referred to as opportunity line items, may be objects representative of certain data relating to an opportunity 142. Similar to Quote Line Items 122, Opportunity Line Items 146 may represent products and/or services a customer is interested in. In an embodiment, an opportunity 142 may have multiple Opportunity Line Items 146. Opportunity Line Items 146 may be associated and/or related to data about products or services including quantity 148, unit price 150, discount 152, and service date 154, which have similar descriptions as quantity 124, unit price 126, discount 128, and service date 130, respectively, except that quantity 148, unit price 150, discount 152, and service date 154, relate to a opportunity line item and quantity 124, unit price 126, discount 128, and service date 130 relate to a quote line item, which were described previously in conjunction with Quote Line Items 122, and therefore the description of quantity 148, unit price 150, discount 152, and service date 154 will not be repeated here. Similarly, HasRevSchedule 156, HasQtySchedule 158, total price 162 and price book 164 have similar descriptions as HasRevSchedule 132, HasQtySchedule 134, total price 138 and price book 140, respectively, except that HasRevSchedule 156, HasQtySchedule 158, total price 162 and price book 164 apply of a quote and HasRevSchedule 132, HasQtySchedule 134, total price 138 and price book 140 apply to an opportunity, which were also previously described in conjunction with Quote 118, and therefore the description of HasRevSchedule 156, HasQtySchedule 158, total price 162 and price book 164 will not be repeated here.

Sales personnel and/or users of the database system may initially synchronize a quote 118 with the quote's parent opportunity 142 either through the user interface (UI) by clicking a "Start Sync" button or through the application programming interface (API) by setting the SyncedQuote 144 field on the parent opportunity 142. During the initial synchronization of a quote 118, quote line items 122 may be copied to an opportunity 142 as opportunity line items 146. The copying of the line items may be accomplished by running a series of operations to delete, update and insert opportunity line items 146 to match the line items on the quote 118. In addition, optionally the price book 164 of the opportunity 142 may be changed to match the price book 140 of the quote 118. For example, a given company may have a standard price book and another price book with high volume discounts built-in. At the time the opportunity was created, the opportunity may have designated the standard price book as price book 164. Then when a quote is offered, the high volume discount price book may have been designated as price book 140. In an embodiment, if the synchronizing is activated, in response to price book 164 being set to the high volume discount price book, price book 140 may be updated by changing price book 140 from the standard price book to the high volume discount price book.

In an embodiment, Opportunity Line Items 146 and associated data may be synchronized with Quote Line items 122 and respective associated data. In an embodiment, changes made to Quote Line items 122 may result in changes to Opportunity Line Items 146 by way of LineItemSyncHelper 108, which may be used for ongoing synchronization of the individual line items of a quote 118 with its parent opportunity 142.

In an embodiment, QuoteSynchronizer 102, QuoteSynchronizerImpl 104, LineItemSyncHelper 108, LineItemSyncHelperImpl 110, and SyncUtil 112 may be the main synchronization classes. The main synchronization classes may contain most of the logic for performing opportunity and quote data synchronization. The code may be structured such that most synchronization logic is in a central place. The interfaces may also be created such that the interfaces are easy to understand and easy to determine what the interfaces accomplish.

Synchronization logic may also be placed in various save/delete/undelete hooks for Opportunity 142, Opportunity Line Items 146, Quote 118, Quote Line Items 122 objects. The hooks may intercept or otherwise detect functions calls to save/delete/undelete functions associated with Opportunity 142, Opportunity Line Items 146, Quote 118, Quote Line Items 122 objects and in response, activate synchronization logic prior to, in association with, and/or just after implementing a save/delete/undelete associated with associated Opportunity 142, Opportunity Line Items 146, Quote 118, and Quote Line Items 122 objects. The custom component allows developers to quickly reuse commonly used functions. For example, a save hook may be an often used function for saving data. In these locations, the synchronization logic may be mainly directed to calling the methods implemented in one or more of the main synchronization classes for performing ongoing synchronization. The initial synchronization may be more segmented as there are more steps and therefore more logic in the Opportunity save hook as well as in QuoteSynchronizer 102 (the initial synchronization is discussed below in conjunction with FIG. 4).

Once a quote 118 is synchronized with the parent opportunity 142, in an embodiment, the system may keep the quote 118 and opportunity 142 synchronized with each other, such that quote 118 is synchronized to opportunity 142 when opportunity 142 is altered and opportunity 142 is synchronized to quote 118 when quote 118 is altered. In an embodiment, when quote line items 122 or opportunity line items 146 are updated, fields on the corresponding opportunity or quote line items are kept in synchronization. In other embodiments, other items may also be synchronized. In an embodiment, when quote line items 122 or opportunity line items 146 are deleted, the corresponding opportunity or quote line items, respectively, may be automatically deleted. When quote or opportunity line items are inserted, equivalent line items may be inserted on the opportunity or quote, respectively.

The pricebook 140 of the quote and pricebook 164 of the opportunity may also be kept in synchronization. In an embodiment, if the opportunity has line items, the price book is not synchronized, and consequently in a further embodiment, the only time the price book is synchronized during ongoing synchronization is when neither the opportunity 142 nor the quote 118 has any line items. In an embodiment, after synchronization, prior to committing the resulting change, a synchronization validation is performed.

In an embodiment, ensuring all line items of a quote and opportunity pair that are marked as requiring synchronization, SyncValidator 106 may further ensure that each of quote line items 122 and the opportunity line items are synchronized.

Once a quote 118 is synchronized with an opportunity 142, synchronized quote lines may be linked with the corresponding opportunity lines the quote lines are synchronizing with. Opportunity line item 146 may be associated with a foreign key that may be included in quote line item 122 that may point the quote line item to the corresponding opportunity line item that needs to be synchronized. Similarly, a foreign key field "QuoteLineItem" may be included in an opportunity line item 146 that points the opportunity line item 146 to a corresponding quote line item 122 to which the opportunity line item 146 is being synchronized. The foreign keys in quote line item 122 and opportunity line item 146 may be set during the initial synchronization with the opportunity. In addition, the foreign key in quote line item 122 associated with an opportunity line item may be set when quote 118 is created based on opportunity 146. In an embodiment, linking the quote line items 122 to corresponding opportunity line items 146 when creating quote 118 enables synchronization of the quote 118 without having to recreate all the opportunity line items.

Figure 2:
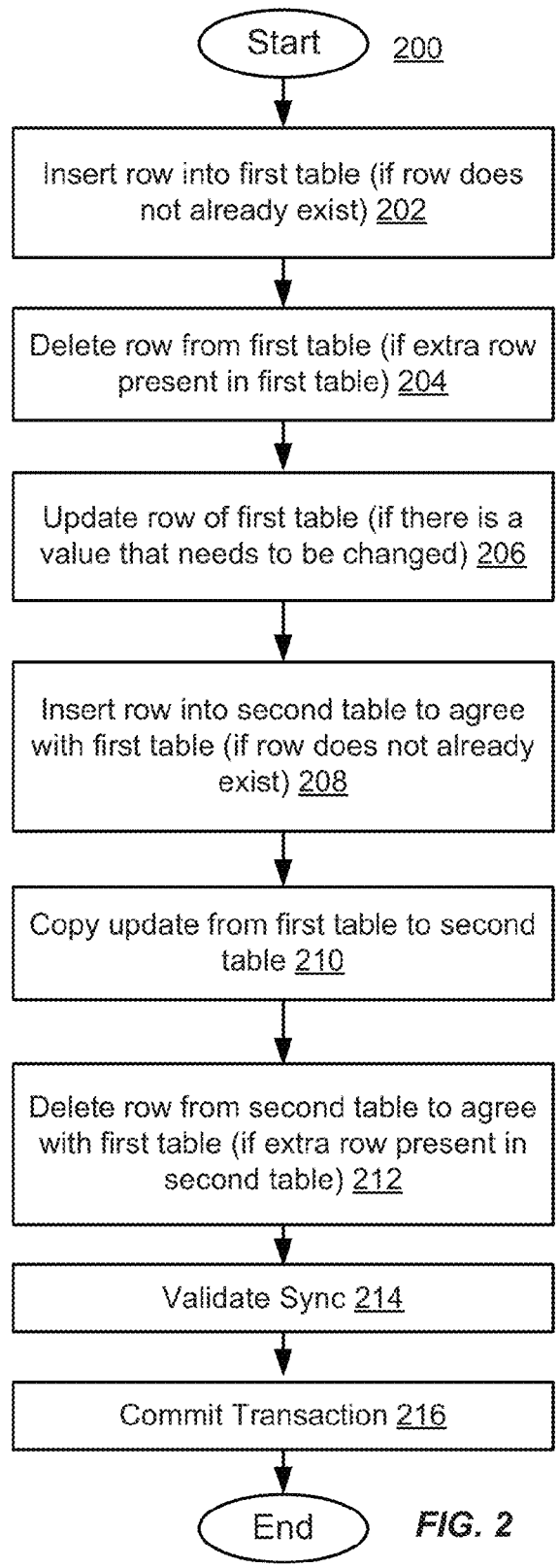
FIG. 2 illustrates a flowchart of an embodiment of a system-side method for synchronizing data in a database network system.

FIG. 2 shows an embodiment of a system-side method 200 for synchronizing data in a database network system. The system-side method 200 may include insert row 202, delete row 204, update row 206, insert row 208, copy update 210, delete row 212, validate 214, and commit 216. In other embodiments, system-side method 200 may not have all the steps listed and/or may have other steps instead of or in addition to those listed.

A system-side method 200 for synchronizing data in a database network system may begin with insert row 202. In step 202, in an embodiment, a row may be inserted into a first table for storing data if the data to be stored or updated requires a new record because a record did not already exist previously. In step 204, a row may be deleted from the first table if the data update deletes data and results in an extra record in the first table containing no data and/or if the update is an express deletion of a particular row that is no longer necessary or applicable. In step 206, if data in a row needs to be changed, the row is updated by changing, adding, and/or filling the row with data representing the update. The update may be a change to default data in a newly created row to more useful data or may be a change in data in a previously existing row. In step 208, a row may be inserted into a second table (which is being synchronized to reflect the changes in the first table) that corresponds to a newly inserted row in the first table. Alternatively, if a record does not exist in the second table that corresponds to a record in the first table, the previously corresponding record may be added to the second table whether or not the corresponding record of the first table was updated.

In step 210, updates to any rows of the first table are copied to the corresponding rows of the second table. In step 212, if an extra row is present in the second table that does not exist in the first table (e.g., because that row was deleted from the first table), the extra row is deleted from the second table to agree with the first table. In step 214, the synchronization of the two tables may be validated. For example, validation may be performed by performing a comparison to verify the two tables contain the same number of rows and/or the rows contain the same field values. Step 214 may be performed in response to activating a save command, which in turn as a result of a hook activates the validation of the synchronization of step 214. If in step 214 it is determined that the two tables have not been properly synchronized, in an embodiment, the transaction is aborted. In an embodiment, the changes to the original record are stored and if the transaction does not commit, the changes are undone and the records are restored to their original state. In an alternative embodiment, the original records are not actually changed unless the transactions commits. Upon verification, in step 216, the tables are synchronized and a commit of the transaction in which the synchronization occurred is performed to apply the changes to the database.

Figure 3:
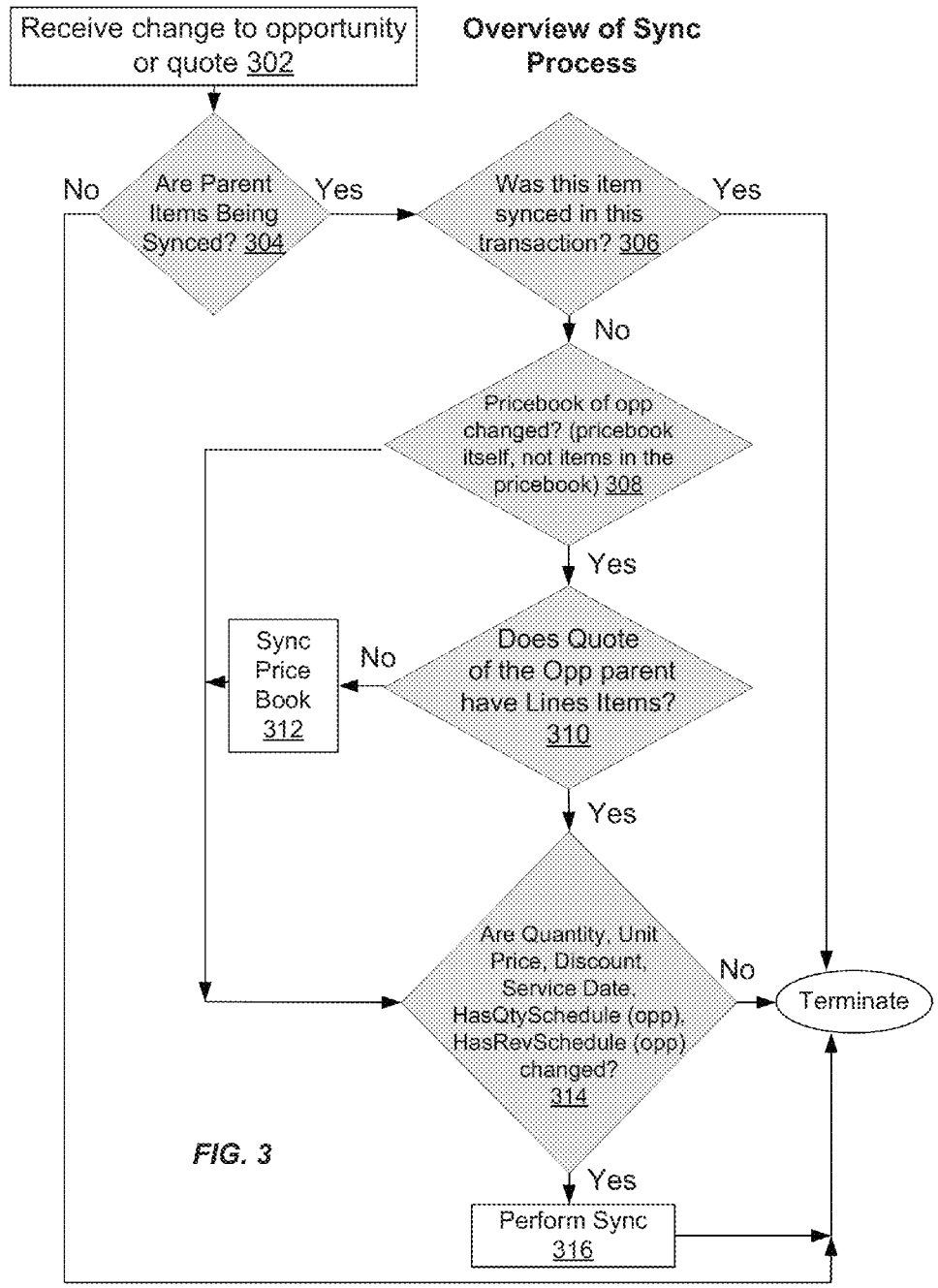
FIG. 3 illustrates a flowchart of an embodiment of a method for synchronizing related opportunity and quote data in a database network system.

FIG. 3 illustrates a flowchart of an embodiment of a method 300 for synchronizing related opportunity and quote data in a database network system. The method 300 may include receive change 302, synchronized parents 304, current synchronization 306, price book changed 308, quote line items 310, synchronization price book 312, line items changed 314, and synchronization 316. In other embodiments, method 300 may not have all of the elements listed and/or may have other elements instead of, or in addition to, those listed.

A method 300 for synchronizing related opportunity and quote data in a database network system may begin with receive change 302. In receive change 302, a database network system may receive a request to make a change to opportunity or quote data from a user. In step 304, a determination is made whether a parent opportunity and a related quote (to which the requested change is to be applied) are currently being synchronized. In an embodiment, the determination may be made by examining whether a logical variable (which may be referred to as the SyncedQuote field) of the parent opportunity indicates that the parent opportunity is being synchronized. For example, if the SyncedQuote field does not indicate that the parent items are to be synchronized, then there is no data to synchronize and the synchronization process terminates. If the SyncedQuote field indicates that the parent opportunity is being synchronized, then in step 306, a determination is made whether a synchronization was performed in the present transaction. The determination may be made by checking whether the IsSynching flag has been set. If the IsSynching flag has been set to TRUE, then a synchronization has already been performed during the present transaction, and therefore the synchronization process terminates to avoid an infinite loop. If the IsSynching flag has been set to FALSE, then in step 308 a determination is made whether the price book of the parent opportunity has changed. The determination may be made while determining if there are other differences between the quote and opportunity by calling a method (which may be referred to SQuote.syncDiff PL/SQL) that returns the difference between quotes and opportunities. In an embodiment the method that checks for differences between quotes and opportunities returns a list of quotes where the price book is different from their opportunity parents, a list of opportunity lines that point to existing quote lines, a list of quote lines that point to existing opportunity lines, a list of opportunity lines that do not point to existing quote lines, and a list of quote lines that do not point to existing opportunity lines. In an embodiment, opportunity line items that do not point to existing quote line items are deleted, which in some cases may remove all of the opportunity line items for the opportunity allowing the price book of the opportunity to be changed. If the price book of the parent opportunity and the related quote has been changed, in step 310, a determination is made whether the related quote has line items. If the quote has no line items, in step 312, the quote price book is synchronized with the changed price book of the parent opportunity. Specifically, the price book of the quote is changed to the price book of the parent opportunity. If the opportunity already has line items, then the method moves from step 310 to step 314, and skips the synchronization of the price book. In step 314, the line items of the related quote are checked for differences with the parent opportunity line items. For example, in an embodiment, quantity, unit price, discount, service date, HasQtySchedule, and/or HasRevSchedule line items of the quote are synchronized with their respective opportunity line item counterparts. Once the quote line items and opportunity line items are synchronized, the synchronization process terminates.

Figure 4:
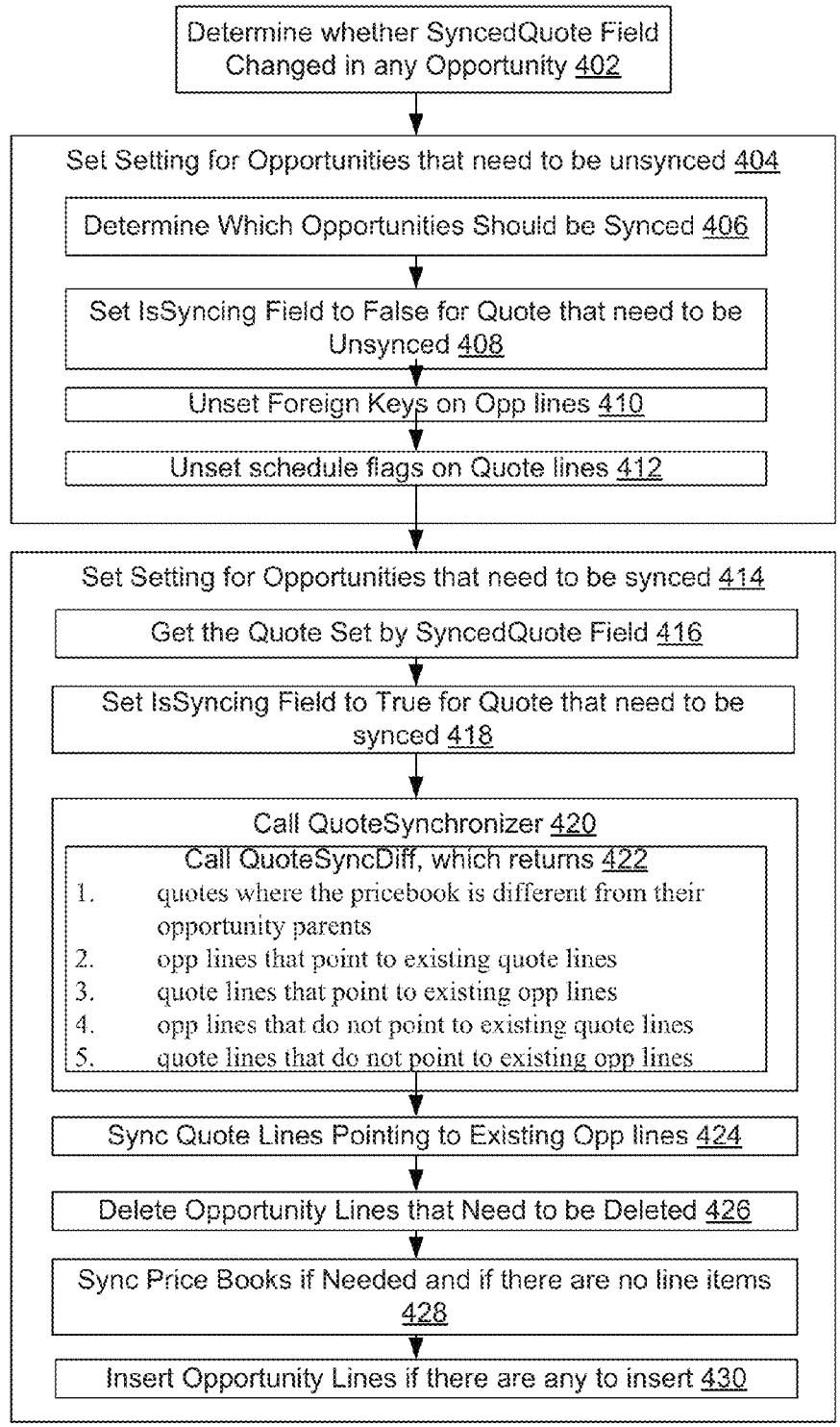
FIG. 4 illustrates a flowchart of an embodiment of a method for performing ongoing opportunity and quote data synchronization.

FIG. 4 illustrates a flowchart of an embodiment of a method 400 for performing initial opportunity and quote data synchronization. The method 400 may include SyncedQuote changes 402, opportunity unsynchronization settings 404, which opps 406, set false IsSyncing 408, unset foreign keys 410, unset schedule flags 412, opportunity synchronization settings 414, get quote 416, set true IsSyncing 418, call quotesynchronizer 420, call quotesyncdiff 422, synchronize quote opportunity lines 424, delete opportunity lines 426, synchronize price books 428, insert opportunity lines 430. In other embodiments, method 400 may not have all of the steps listed and/or may have other elements instead of, or in addition to, those listed.

Initial Synchronization

Method 400 for initial synchronization of opportunity and quote data may begin with SyncedQuote changes 402. In step 402, initial synchronization may be initiated by a function that is activated by a save hook that is associated with an opportunity that is performed once before the rest of the workflow (which may be referred to as OpportunityFunctions.saveHook_BeforeWorkflowOnce), which may identify opportunities by checking changed SyncedQuote fields and determining where the SyncedQuote fields point. In step 404, settings of opportunities that are not being synchronized according to steps 406-412 that follow are performed. In step 406, a determination may be made to determine which opportunities should be unsynchronized. In step 408, for those opportunities that need to be unsynchronized, the logical variable (e.g, IsSyncing) that indicates whether the opportunity is being synced is set to false (the IsSyncing field to FALSE) for quotes that are to be unsynchronized. In step 410, the foreign keys of quote line items that point to the opportunity line items are unset. In step 412, the function triggered by a save hook (e.g. OpportunityFunctions.saveHook_BeforeWorkflowOnce) may unset schedule flags on the quote lines.

In step 414, the settings of the opportunities determined to need synchronization are set. In step 416, for the opportunities to be synchronized by a function triggered by a save hook (e.g., OpportunityFunctions.saveHook_BeforeWorkflowOnce) may retrieve the quotes set by SyncedQuote field. In step 418, the IsSyncing field may be set to TRUE by a function triggered by a save hook (e.g., OpportunityFunctions.saveHook_BeforeWorkflowOnce) for quotes that need to be synchronized.

In step 420, the function triggered by the save hook (e.g., OpportunityFunctions.saveHook_BeforeWorkflowOnce) may then call a function that synchronizes a quote (e.g., QuoteSynchronizer.sync( )) to the corresponding opportunities. In step 422, the function that synchronizes the quote (e.g., QuoteSynchronizer.sync( )) may call the method that returns the difference between the quote and the opportunity (SQuote.syncDiff pl/sql). The method that returns the difference between the quote and the opportunity may return five lists. The lists may include (1) quotes where the price book is different from the quote's opportunity parents (2) opportunity lines that point to existing quote lines (3) quote lines that point to existing opportunity lines (4) opportunity lines that do not point to existing quote lines and (5) quote lines that do not point to existing opportunity lines. In step 424, if there are quote lines that point to existing opportunity lines, the function that was triggered by the save hook (e.g., OpportunityFunctions.saveHook_BeforeWorkflowOnce) may synchronize the quote lines that point to existing opportunity lines by calling another function that synchronizes individual lines of the quote (e.g., LineItemHelper.syncExistingLineItemsInternal). In an embodiment, the function that synchronizes individual lines of the quote (e.g., LineItemHelper.syncExistingLineItemsInternal) may get the corresponding opportunity lines and update them to match the quote lines.

In step 426, a function that synchronizes individual lines of the quote (e.g., OpportunityFunctions.saveHook_BeforeWorkflowOnce) may check if there are any opportunity lines to delete by determining if there are any opportunity lines that do not point to existing quote lines. In an embodiment, the function triggered by the save hook (e.g., OpportunityFunctions.saveHook_BeforeWorkflowOnce) loads these opportunity lines and deletes them.

In step 428, in an embodiment, after synchronizing quote lines that point to existing opportunity lines and checking if there are any opportunity lines to delete, the function triggered by the save hook (e.g., OpportunityFunctions.saveHook_BeforeWorkflowOnce) synchronizes pricebooks if needed. The function triggered by the save hook (e.g., OpportunityFunctions.saveHook_BeforeWorkflowOnce) determines if there are any quotes where the price book is different from their opportunity parents and synchronizes the price books of the quotes and opportunities by calling a function for synchronizing the price book (e.g., syncPricebookInternal). In an embodiment, calling the function for synchronizing the price book (e.g., syncPricebookInternal) will get the corresponding opportunities and update their price books to match the quote price books. In an embodiment, price books may not be changed until line items are deleted, because changing price books on synchronized opportunities if there are line items is prohibited. In an alternative embodiment, changing price books without changing line items is permitted and/or changing the price book on synchronized opportunities when there are line items is permitted.

In step 430, in an embodiment, the function triggered by the save hook (e.g., OpportunityFunctions.saveHook_BeforeWorkflowOnce) checks if there are any opportunity lines to insert by determining if there are any quote lines that do not point to existing opportunity lines. In an embodiment, the function triggered by the save hook (e.g., OpportunityFunctions.saveHook_BeforeWorkflowOnce) may load the quote lines that need to be inserted into the opportunity and may insert the corresponding opportunity lines to match the quote lines that were loaded.

In an embodiment, the logic supports bidirectional synchronization, from quote to opportunity or opportunity to quote, and a function is included for specifying the direction of sysnchronization (e.g., SyncDirection enum).

For the initial synchronization, the logic may be implemented in the Opportunity entity save lifecycle, because the synchronization is implemented using the synchronization quote (e.g., SyncedQuote) lookup field to synchronize the Opportunity, as described previously. In one embodiment, the initial synchronization logic is located in the same place as ongoing synchronization for the Opportunity (e.g., in OpportunityFunctions.saveHook_PostSummariesOnce). In an embodiment, to avoid strange behavior such as items not rolling back properly (e.g., an error may be thrown, even though not everything in the transaction has been rolled back), the synchronization logic may be located in a location that is associated with the hook that triggers the synchronization before the work flow begins (e.g., OpportunityFunctions.saveHook_BeforeWorkflowOnce). Executing a hook before the workflow begins may allow the initial synchronization logic to be executed in basically the same place that post triggers are executed. Executing the initial synchronization logic and post triggers in basically the same place may provide uniformity with the rest of entity save logic, e.g. if the initial synchronization was implemented as a post trigger it should work the same way as when the initial synchronization is not a post trigger. Executing a hook before the workflow begins may also be consistent with keeping the initial synchronization within the recursive save detection boundaries, which means the workflow will execute once on the Opportunity and the rollups from the Opportunity will also execute once. In an embodiment, an opportunity or quote can only be synchronized once during the save process. Attempts to cause an additional synchronization to the same object (opportunity or quote) may result in the synchronization process failing. Executing a hook before workflow begins works similarly to implementing the initial synchronization as a post trigger and may be more intuitive to a user.

Ongoing Synchronization

Figure 5:
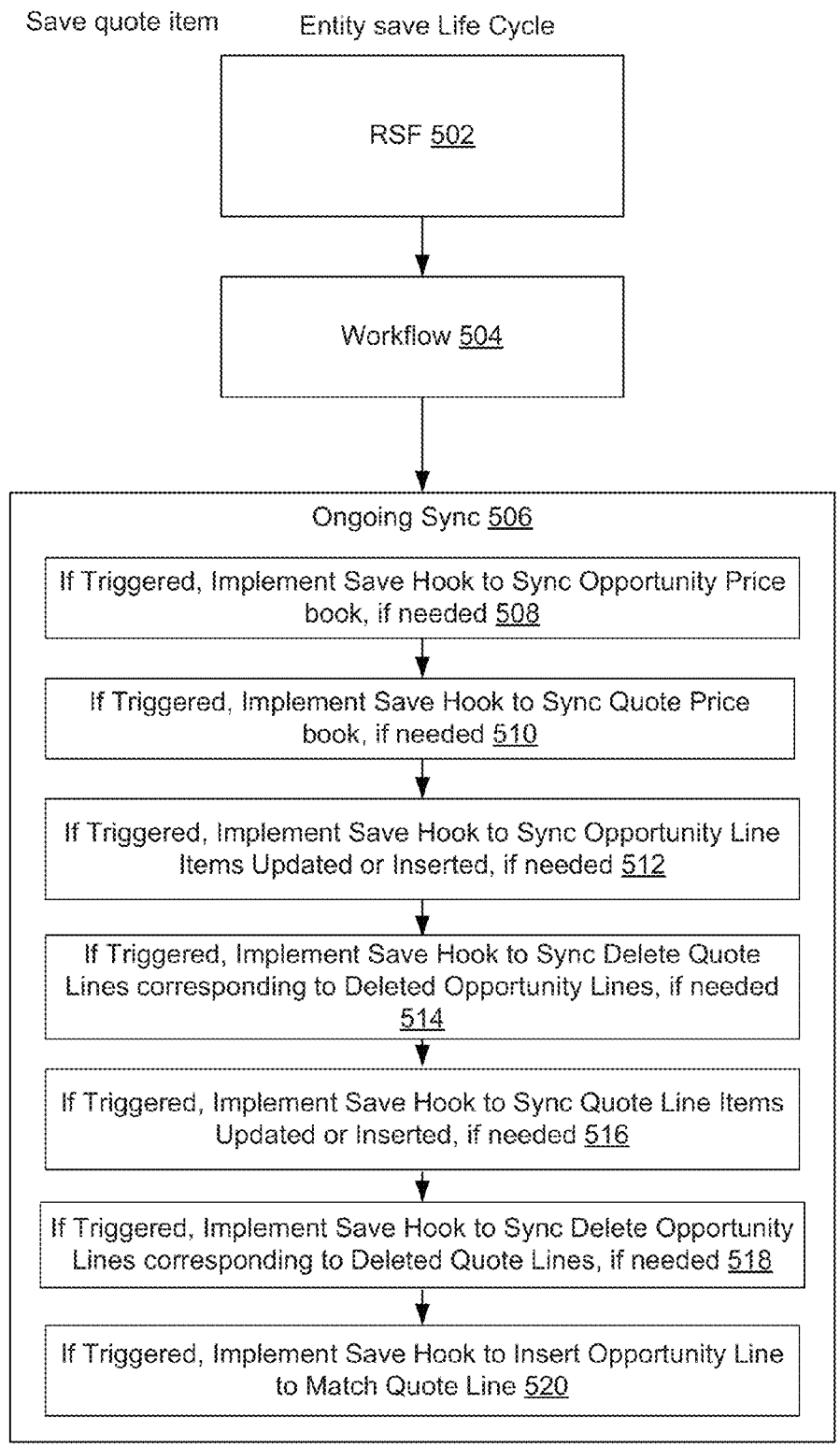
FIG. 5 illustrates a flowchart of an embodiment of a method for performing initial opportunity and quote data synchronization.

FIG. 5 illustrates a flowchart of an embodiment of a method 500 for performing ongoing opportunity and quote data synchronization. The method 500 may include rollup 502, workflow 504, ongoing synchronization 506, synchronization opportunity 508, synchronization quote 510, synchronization opportunity line items 512, synchronization delete quote line items 514, synchronization quote line items 516, synchronization delete opportunity line items 518, and insert opportunity line items 520. In other embodiments, method 500 may not have all of the steps listed and/or may have other elements instead of, or in addition to, those listed.

A method 500 may begin with rollup 502. Rollup 502 may include executing functions and instructions necessary to perform calculations for rollup summary fields. As explained previously, a rollup summary field (rsf) may contain the total sum pricing of all products that a customer may be potentially interested in purchasing, given as part of quote. Alternatively, a rsf may contain the highest value from a set of related records, the lowest value from a set of related records, or a total count of the number of records.

In step 504, scheduled workflow tasks may be handled. For example, user specified processes such as updating data fields, sending email notifications, or any workflow actions that are to be completed when certain user specified conditions are met, may be handled in workflow 504.

In an embodiment, it may be desirable for implementation of the synchronization of opportunity and quote data produce a synchronization algorithm that performs well, is easy to understand and debug, handles errors properly, maintains data integrity, and integrates well with the existing entity save logic. A potential difficulty in synchronizing opportunity and quote data may be the initial synchronization and ongoing synchronization can both trigger additional logic (through triggers, workflow, etc.) that could cause recursion, infinite looping, and unexpected behavior. In an embodiment, to avoid synchronization difficulties, the ongoing synchronization logic may be positioned as late in the entity save lifecycle as possible, preferably after rollup 502 and workflow 504. For example, if updating an opportunity line item, the triggers and rollup to opportunity may occur before synchronizing changes to the quote line item. In an embodiment, the method 500 waits for quote line item saves to complete, which includes waiting for rollup 502 to complete, before synchronizing the opportunity line item. Since the synchronization waits for the quote line items save to complete and for rollup 502 to complete before synchronizing the opportunity line item, all of the ongoing synchronization logic and save hooks occur after rollup 502 and workflow 504 have been completed.

In step 506, the logic for ongoing synchronization may be implemented. In an embodiment, the logic for ongoing synchronization may be located in routines that are triggered as a result of various save hooks in the objects that support synchronization, which may be Opportunity, OppLineItem, Quote, and QuoteLineItem. Having the logic for ongoing synchronization located in various save hooks in the objects that support synchronization may enable a determination of when these objects are updated, inserted, deleted (in an embodiment only line items are deleted) and undeleted (in an embodiment only quote lines are undeleted). In an embodiment, each of the save hooks (or each of the save hooks that trigger the synchronization) may occur after workflow 504 and rollup 502 have been completed for the object.

In step 508, if the opportunity price book is different than the quote and there are no line items in the opportunity, the save hook that occurs after rollup (e.g, OpportunityFunctions.saveHook_PostSummariesOnce) calls a function that synchronizes the quote during an update (e.g., QuoteSynchronizer.syncOnUpdate( )) to synchronize the opportunity price book with the quote. The save hook that occurs after rollup (e.g., OpportunityFunctions.saveHook_ PostSummariesOnce) may be part of an entity save framework and allow object specific customizations to the save flow. In step 510, if the quote price book is different than the opportunity and there are no line items in the opportunity, the save hook that occurs after rollup (e.g., QuoteFunctions.saveHook_PostSummariesOnce) calls a function that synchronizes the opportunity during an update (e.g., QuoteSynchronizer.syncOnUpdate( )) to synchronize the quote price book with the opportunity.

In step 512, if opportunity line items were inserted or updated and have fields differing from the synchronizing quote line item, the save hook that occurs after rollup (e.g.OpportunityLineItemFunctions-.saveHook_PostSummariesOnce) calls a function that synchronizes the quote line items during an update (e.g., LineItemSyncHelper.syncLineItemsOnUpdateInsert) to synchronize the opportunity line items with the quote line items.

In step 514, if opportunity line items were deleted, the delete hook that occurs after rollup (e.g., OpportunityLineItemFunctions.deleteHook_BeforeDeleteOnce) calls a function that synchronizes quote line items (e.g. LineItemSyncHelper.syncLineItemsOnDelete) to delete the quote line items that correspond to the opportunity line items that got deleted.

In step 516, if quote line items were inserted or if quote line items were updated resulting in one or more fields differing from the synchronizing opportunity line items, the save hook that occurs after rollup (e.g., QuoteLineItemFunctions.saveHook_PostSummariesOncerice) calls a function that synchronizes quote line items (e.g., LineItemSyncHelper.syncLineItemsOnUpdateInsert) to synchronize the inserted or updated quote line items.

In step 518, if quote line items were deleted, the delete hook that occurs after rollup (e.g., QuoteLineItemFunctions.deleteHook_BeforeDeleteOnce) calls a function that synchronizes opportunity line items (e.g., LineItemSyncHelper.syncLineItemsOnDelete) to delete the opportunity line items that correspond to the quote line items that got deleted.

In step 520, if quote line items were undeleted, the undelete hook that occurs after rollup (e.g. QuoteLineItemFunctions.undeleteHook_AfterUndeleteOnce) calls a function that synchronizes opportunity line items (e.g., LineItemSyncHelper.syncQuoteLineItemsOnUndelete) to insert opportunity line items to match the quote line items that were undeleted.

In an embodiment, all of the methods may work in batch and expect to receive a collection of objects from the current dmlOperationState. Any errors caught during a save operation may be mapped back to the original source object. In an embodiment, having access to the current dmlOperationState may allow calling setThrowable on the object desired to be "error" out. In an embodiment, it may be desirable to ensure that the object that was the source of the synchronization errored out, not the target of the synchronization. For example, if an opportunity line item was updated (it is the source), an attempt is made to synchronize the opportunity line item's corresponding quote line item (the target). If the attempt to synchronize the opportunity line item's corresponding quote line item fails, it may be desirable to call setThrowable on the opportunity line item. (See LineItemSyncHelper.handleSaveErrors). LineItemSyncHelper.handleSaveErrors may handle errors that occur during the synchronization process. In an embodiment, LineItemSyncHelper.handleSaveErrors maps errors to the correct objects. For example, if both quote 1 and quote 2 are being synchronized and quote 2 causes an error, the error would only be mapped to quote 2.

Synchronization performance is another consideration in the synchronization process. In an embodiment, all synchronization operations (both for initial synchronization and ongoing synchronization) may be compatible in batch so that API batch operations may perform and scale properly. In an embodiment, in order for API batch operation to perform and scale properly, all places executing synchronization logic may expect to receive a collection of objects from the current dml batch operation (usually from the dmlOperationState). When loading objects from the dml batch operation, assumptions may be made about when objects may already be in the current transaction map cache and use UddDb.getEntityObject( ) to retrieve objects. In an embodiment, if it is unceratin if an entity has already been loaded in the current transaction, objects that are needed are bulk loaded upfront, then UddDb.getEntityObject( ) may be used to retrieve the objects once it is determined the objects are in the transaction map. For example, when line items are updated, it may be necessary to verify if the line items and the line item parents are synchronizing with each other. The parent ids are needed and therefore may be bulk loaded upfront, then UddDb.getEntityObject( ) may be used to retrieve the parent ids at a later time when necessary to check their synchronization state.

Another synchronization consideration is error handling. Because all operations may need to be compatible with batch, the operations may also map errors back to the right objects so that the entity save framework can properly handle errors in the batch, including handling partial failures.

Infinite Loop Detection

Figure 6:
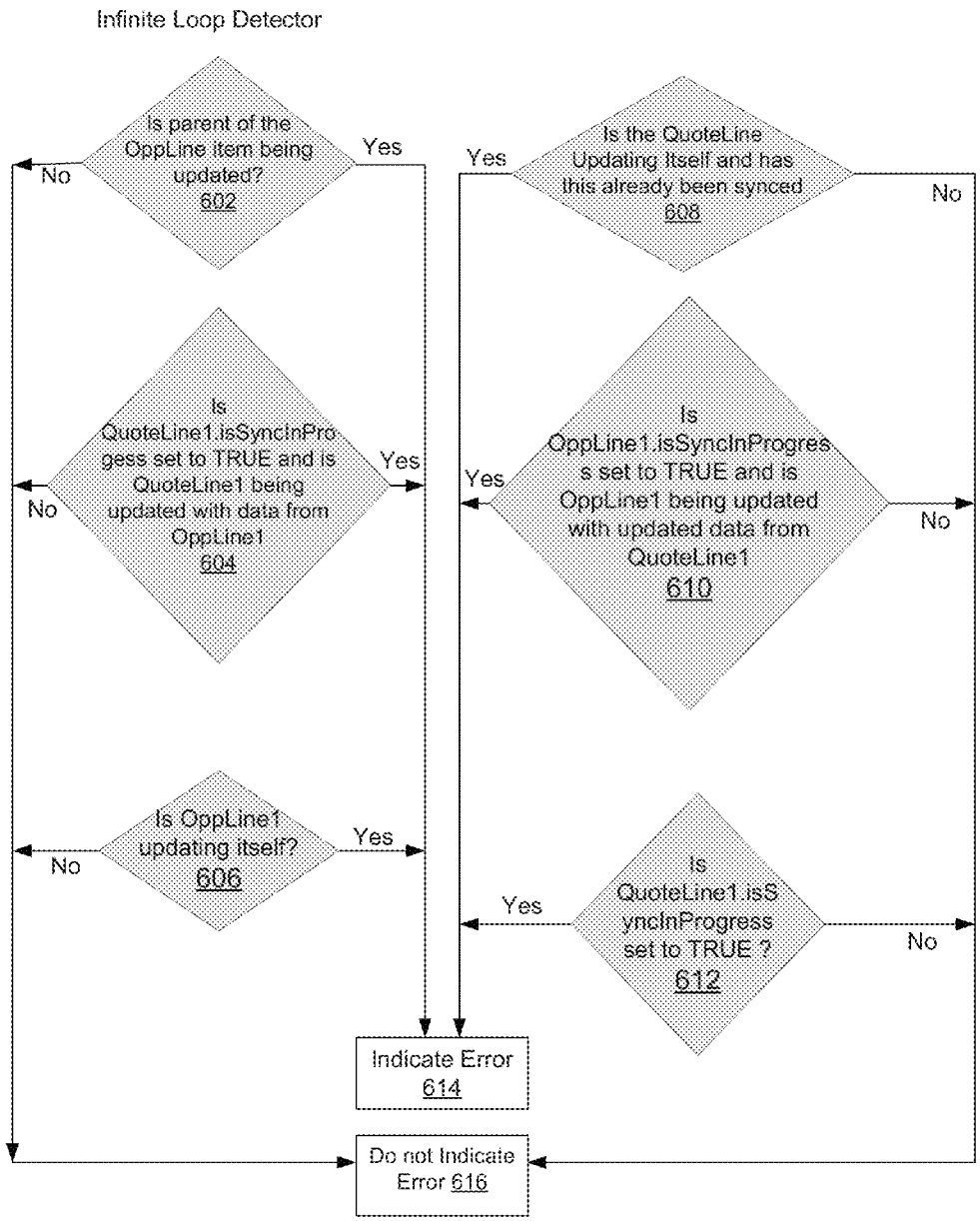
FIG. 6 illustrates a flowchart of an embodiment of a method for detecting infinite loop occurrences when synchronizing opportunity and quote data.

FIG. 6 illustrates a flowchart of an embodiment of a method 600 for detecting infinite loop occurrences when synchronizing opportunity and quote data. A method 600 may include Opportunity Line parent update 602, Quote Line 1 True 604, Opportunity Line updating 606, Quote Line updating 608, Opportunity Line1 True 610, Quote Line1 Synchronization In Progress 612, RecursiveSynchronization Exception 614, and no error 616. In other embodiments, method 600 may not have all of the steps listed and/or may have other elements instead of, or in addition to, those listed.

Triggers and other working logic can cause infinite loops when synchronized quotes or opportunities are involved. For example, triggers on both the quote and opportunity can cause the synchronization logic to continually synchronize back and forth. In an embodiment, to prevent infinite loops due to continual back and forth synchronization, when objects that support synchronization have already begun the synchronization process, the object cannot be synchronized again during the same transaction.

In an embodiment, four objects that support synchronization, Opportunity, OppLineItem, Quote, and QuoteLineItem, may implement a Syncable interface. The Syncable interface may define the set/getIsSyncInProgress methods. These methods set and get a boolean rollbackable variable (e.g., isSyncInProgess) on the objects supporting synchronization, indicating when an object is currently being synchronized. In an embodiment, a function may be called on an object that supports synchronization for indicating a synchronization is in progress, (e.g., syncSyncUtil.setSyncStateToInProgress( ) method). In an embodiment, if the object is already in the process of synchronizing, calling the function for indicating a synchronization is in progress (e.g., SyncUtil.setSyncStateToInProgress( )) may result in a RecursiveSyncException being thrown. A RecursiveSyncException indicates an error which may result in infinite loops if synchronization is allowed to execute.

A method 600 illustrates when an infinite loop may occur and a RecursiveSyncException 614 thrown. In step 602, if the parent of an OppLineItem is being updated, a Recursive SyncException 614 may be thrown. Step 602 illustrates the case of an object already in synchronization progress where the function for indicating a synchronization is in progress (e.g., SyncUti.setSyncStateToInProgress( )) may be attempted to be called, resulting in a RecursiveSyncException 614 being thrown. If the parent of an OppLineItem is not being updated, then no error 616 occurs.

In step QuoteLine1 True 604, if Boolean rollbackable variable (e.g., QuoteLine1.isSyncInProgress) is set to TRUE and the quote line item is being updated with data from the parent opportunity line item, then a RecursiveSyncException 614 may be thrown. If the Boolean rollbackable variable is FALSE, then no error 616 occurs.

In step 606, if an opportunity line item is updating itself due to a post trigger, a RecursiveSyncException 614 may be thrown. If an opportunity line item is not updating itself due to a post trigger, then no error 616 occurs.

In step 608, if a quote line item is updating itself due to a post trigger, a RecursiveSyncException 614 may be thrown. If a quote line item is not updating itself due to a post trigger, then no error 616 occurs.

In step 610, if a Boolean rollbackable variable (e.g. OppLine1.isSyncInProgress) is set to TRUE and the Opportunity line item is being updated with updated data from a quote line, then a RecursiveSyncException 616 may be thrown. If the Boolean rollbackable variable (e.g., Oppline1.isSyncInProgress) is set to FALSE or if Opportunity line item is not being updated with updated data from a quote line, then no error 616 occurs.

In step 612, if the Boolean rollbackable variable (e.g., QuoteLine1.isSyncInProgress) is set to TRUE, a Recursive-SyncException 614 may be thrown. If the Boolean rollbackable variables are set to FALSE, then no error 616 occurs.

System Overview

Figure 7:
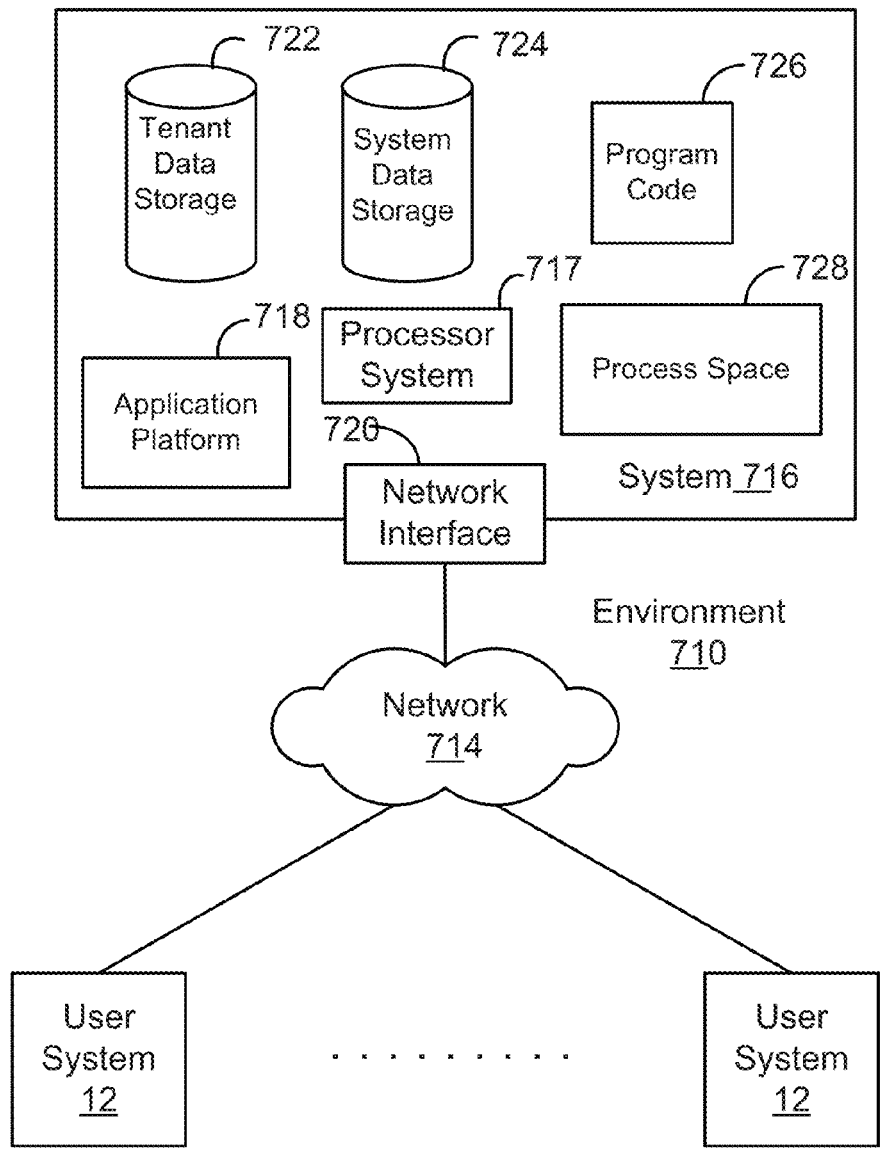
FIG. 7 illustrates a block diagram of an example of an environment wherein an on-demand database service might be used.

FIG. 7 illustrates a block diagram of an environment 710 wherein an on-demand database service might be used. Environment 710 may include user systems 712, network 714, system 716, processor system 717, application platform 718, network interface 720, tenant data storage 722, system data storage 724, program code 726, and process space 728. In other embodiments, environment 710 may not have all of the components listed and/or may have other elements instead of, or in addition to, those listed above.

Environment 710 is an environment in which an on-demand database service exists. User system 712 may be any machine or system that is used by a user to access a database user system. For example, any of user systems 712 can be a handheld computing device, a mobile phone, a laptop computer, a work station, and/or a network of computing devices. As illustrated in FIG. 7 (and in more detail in FIG. 8) user systems 712 might interact via a network 714 with an on-demand database service, which is system 716.

An on-demand database service, such as system 716, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 716" and "system 716" will be used interchangeably herein. A database image may include one or more database objects. A relational database management system (RDMS) or the equivalent may execute storage and retrieval of information against the database object(s). Application platform 718 may be a framework that allows the applications of system 716 to run, such as the hardware and/or software, e.g., the operating system. In an embodiment, on-demand database service 716 may include an application platform 718 that enables creation, managing and executing one or more applications developed by the provider of the on-demand database service, users accessing the on-demand database service via user systems 712, or third party application developers accessing the on-demand database service via user systems 712.

The users of user systems 712 may differ in their respective capacities, and the capacity of a particular user system 712 might be entirely determined by permissions (permission levels) for the current user. For example, where a salesperson is using a particular user system 712 to interact with system 716, that user system has the capacities allotted to that salesperson. However, while an administrator is using that user system to interact with system 716, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level. Network 714 is any network or combination of networks of devices that communicate with one another. For example, network 714 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the one or more implementations might use are not so limited, although TCP/IP is a frequently implemented protocol.

User systems 712 might communicate with system 716 using TCP/IP and, at a higher network level, use other common Internet protocols to communicate, such as HTTP, FTP, AFS, WAP, etc. In an example where HTTP is used, user system 712 might include an HTTP client commonly referred to as a "browser" for sending and receiving HTTP messages to and from an HTTP server at system 716. Such an HTTP server might be implemented as the sole network interface between system 716 and network 714, but other techniques might be used as well or instead. In some implementations, the interface between system 716 and network 714 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 716, shown in FIG. 7, implements a web-based customer relationship management (CRM) system. For example, in one embodiment, system 716 includes application servers configured to implement and execute CRM software applications as well as provide related data, code, forms, webpages and other information to and from user systems 712 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 716 implements applications other than, or in addition to, a CRM application. For example, system 716 may provide tenant access to multiple hosted (standard and custom) applications, including a CRM application. User (or third party developer) applications, which may or may not include CRM, may be supported by the application platform 718, which manages creation, storage of the applications into one or more database objects and executing of the applications in a virtual machine in the process space of the system 716.

One arrangement for elements of system 716 is shown in FIG. 7, including a network interface 720, application platform 718, tenant data storage 722 for tenant data 723, system data storage 724 for system data 725 accessible to system 716 and possibly multiple tenants, program code 726 for implementing various functions of system 716, and a process space 728 for executing MTS system processes and tenant-specific processes, such as running applications as part of an application hosting service. Additional processes that may execute on system 716 include database indexing processes.

Several elements in the system shown in FIG. 7 include conventional, well-known elements that are explained only briefly here. For example, each user system 712 could include a desktop personal computer, workstation, laptop, PDA, cell phone, or any wireless access protocol (WAP) enabled device or any other computing device capable of interfacing directly or indirectly to the Internet or other network connection. User system 712 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 712 to access, process and view information, pages and applications available to it from system 716 over network 714. Each user system 712 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 716 or other systems or servers. For example, the user interface device can be used to access data and applications hosted by system 716, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 712 and all of its components are operator configurable using applications, such as a browser, including computer code run using a central processing unit such as an Intel Pentium® processor or the like. Similarly, system 716 (and additional instances of an MTS, where more than one is present) and all of their components might be operator configurable using application(s) including computer code to run using a central processing unit such as processor system 717, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 716 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 716 is configured to provide webpages, forms, applications, data and media content to user (client) systems 712 to support the access by user systems 712 as tenants of system 716. As such, system 716 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 8:
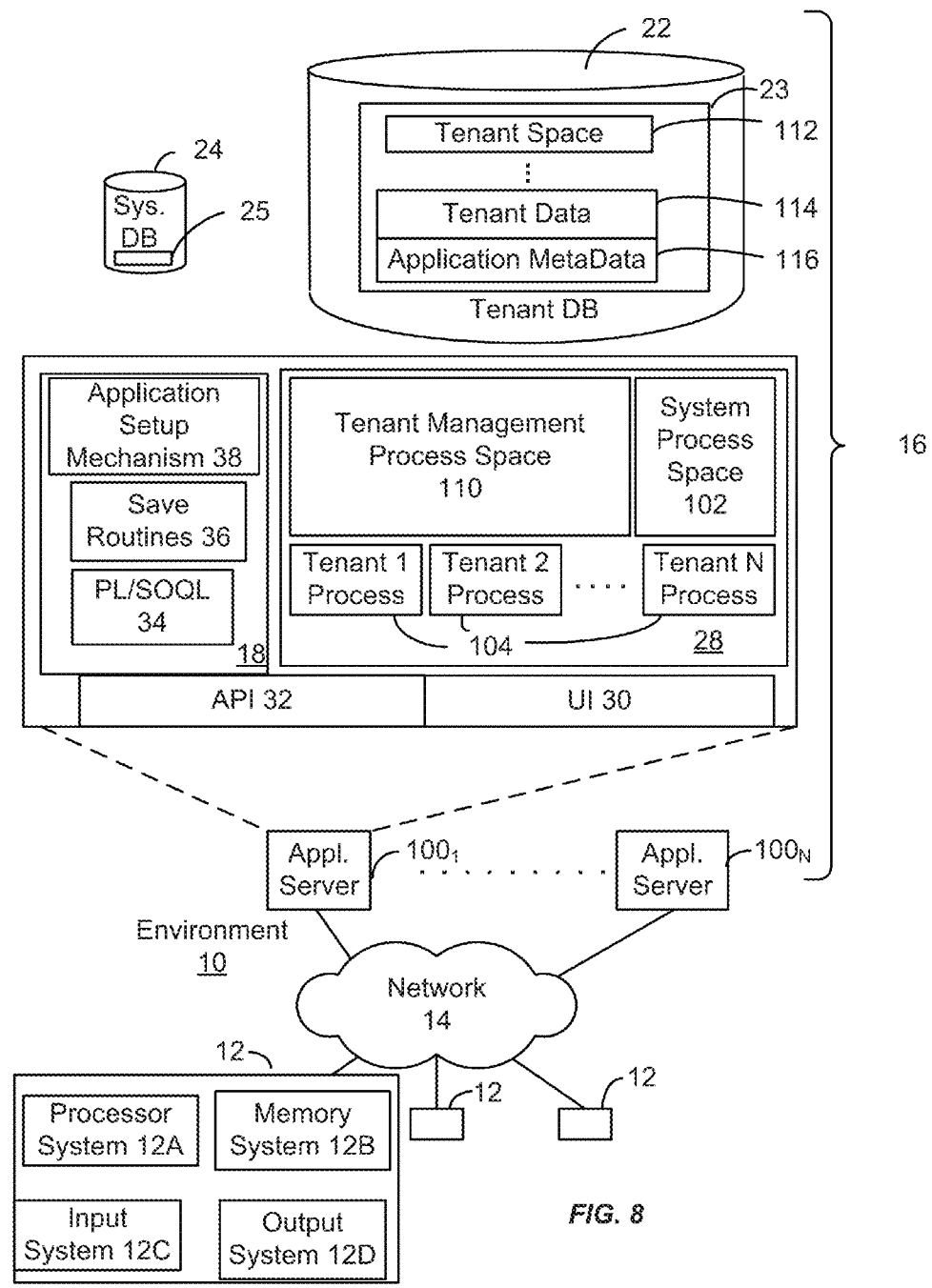
FIG. 8 illustrates a block diagram of an embodiment of elements of FIG. 7 and various possible interconnections between these elements.

FIG. 8 also illustrates environment 710. However, in FIG. 8 elements of system 716 and various interconnections in an embodiment are further illustrated. FIG. 8 shows that user system 712 may include processor system 712A, memory system 712B, input system 712C, and output system 712D. FIG. 8 shows network 714 and system 716. FIG. 8 also shows that system 716 may include tenant data storage 722, tenant data 723, system data storage 724, system data 725, User Interface (UI) 830, Application Program Interface (API) 832, PL/SOQL 834, save routines 836, application setup mechanism 838, applications servers $800_1$-$800_N$, system process space 802, tenant process spaces 804, tenant management process space 810, tenant storage area 812, user storage 814, and application metadata 816. In other embodiments, environment 710 may not have the same elements as those listed above and/or may have other elements instead of, or in addition to, those listed above.

User system 712, network 714, system 716, tenant data storage 722, and system data storage 724 were discussed above in FIG. 7. Regarding user system 712, processor system 712A may be any combination of one or more processors. Memory system 712B may be any combination of one or more memory devices, short term, and/or long term memory. Input system 712C may be any combination of input devices, such as one or more keyboards, mice, trackballs, scanners, cameras, and/or interfaces to networks. Output system 712D may be any combination of output devices, such as one or more monitors, printers, and/or interfaces to networks. As shown by FIG. 8, system 716 may include a network interface 720 (of FIG. 7) implemented as a set of HTTP application servers 800, an application platform 718, tenant data storage 722, and system data storage 724. Also shown is system process space 802, including individual tenant process spaces 804 and a tenant management process space 810. Each application server 800 may be configured to tenant data storage 722 and the tenant data 723 therein, and system data storage 724 and the system data 725 therein to serve requests of user systems 712. The tenant data 723 might be divided into individual tenant storage areas 812, which can be either a physical arrangement and/or a logical arrangement of data. Within each tenant storage area 812, user storage 814 and application metadata 816 might be similarly allocated for each user. For example, a copy of a user's most recently used (MRU) items might be stored to user storage 814. Similarly, a copy of MRU items for an entire organization that is a tenant might be stored to tenant storage area 812. A UI 830 provides a user interface and an API 832 provides an application programmer interface to system 716 resident processes to users and/or developers at user systems 712. The tenant data and the system data may be stored in various databases, such as one or more Oracle™ databases.

Application platform 718 includes an application setup mechanism 838 that supports application developers' creation and management of applications, which may be saved as metadata into tenant data storage 722 by save routines 836 for execution by subscribers as one or more tenant process spaces 804 managed by tenant management process 810 for example. Invocations to such applications may be coded using PL/SOQL 834 that provides a programming language style interface extension to API 832. A detailed description of some PL/SOQL language embodiments is discussed in commonly owned U.S. Provisional Patent Application 60/828,192 entitled, PROGRAMMING LANGUAGE METHOD AND SYSTEM FOR EXTENDING APIS TO EXECUTE IN CONJUNCTION WITH DATABASE APIS, by Craig Weissman, filed Oct. 4, 2006, which is incorporated in its entirety herein for all purposes. Invocations to applications may be detected by one or more system processes, which manage retrieving application metadata 816 for the subscriber making the invocation and executing the metadata as an application in a virtual machine.

Each application server 800 may be communicably coupled to database systems, e.g., having access to system data 725 and tenant data 723, via a different network connection. For example, one application server $800_1$ might be coupled via the network 714 (e.g., the Internet), another application server $800_{N-1}$ might be coupled via a direct network link, and another application server $800_N$ might be coupled by yet a different network connection. Transfer Control Protocol and Internet Protocol (TCP/IP) are typical protocols for communicating between application servers 800 and the database system. However, it will be apparent to one skilled in the art that other transport protocols may be used to optimize the system depending on the network interconnect used.

In certain embodiments, each application server 800 is configured to handle requests for any user associated with any organization that is a tenant. Because it is desirable to be able to add and remove application servers from the server pool at any time for any reason, there is preferably no server affinity for a user and/or organization to a specific application server 800. In one embodiment, therefore, an interface system implementing a load balancing function (e.g., an F5 Big-IP load balancer) is communicably coupled between the application servers 800 and the user systems 712 to distribute requests to the application servers 800. In one embodiment, the load balancer uses a least connections algorithm to route user requests to the application servers 800. Other examples of load balancing algorithms, such as round robin and observed response time, also can be used. For example, in certain embodiments, three consecutive requests from the same user could hit three different application servers 800, and three requests from different users could hit the same application server 800. In this manner, system 716 is multi-tenant, wherein system 716 handles storage of, and access to, different objects, data and applications across disparate users and organizations.

As an example of storage, one tenant might be a company that employs a sales force where each salesperson uses system 716 to manage their sales process. Thus, a user might maintain contact data, leads data, customer follow-up data, performance data, goals and progress data, etc., all applicable to that user's personal sales process (e.g., in tenant data storage 722). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 716 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 716 might also maintain system level data usable by multiple tenants or other data. Such system level data might include industry reports, news, postings, and the like that are sharable among tenants.

In certain embodiments, user systems 712 (which may be client systems) communicate with application servers 800 to request and update system-level and tenant-level data from system 716 that may require sending one or more queries to tenant data storage 722 and/or system data storage 724. System 716 (e.g., an application server 800 in system 716) automatically generates one or more SQL statements (e.g., one or more SQL queries) that are designed to access the desired information. System data storage 724 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Method for Using the Environment (FIGS. 7 and 8)

Figure 9:
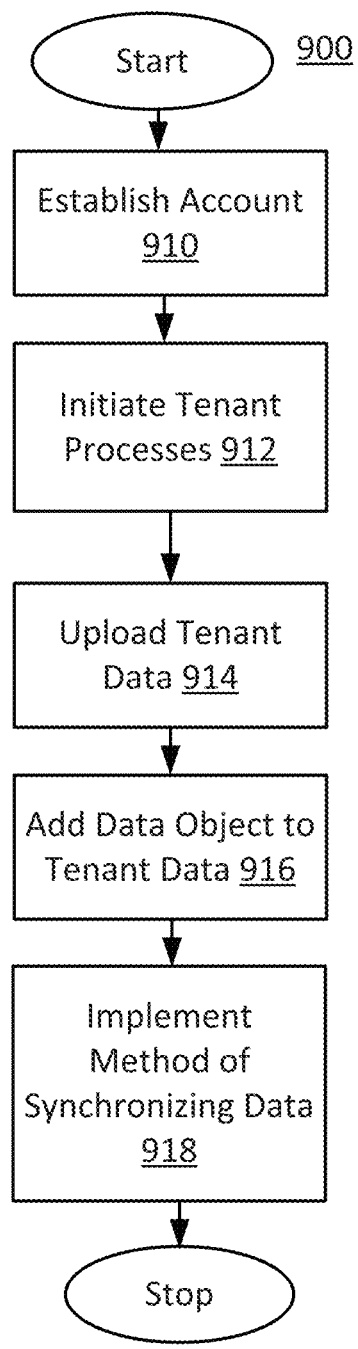
FIG. 9 is a flowchart of an example of a method of using the environment of FIGS. 7 and 8.

FIG. 9 shows a flowchart of an example of a method 900 of using environment 710. In step 910, user system 712 (FIGS. 7 and 8) establishes an account. In step 912, one more tenant process space 804 (FIG. 8) are initiated on behalf of user system 712, which may also involve setting aside space in tenant space 812 (FIG. 8) and tenant data 814 (FIG. 8) for user system 712. Step 912 may also involve modifying application metadata to accommodate user system 712. In step 914, user system 712 uploads data. In step 916, one or more data objects are added to tenant data 814 where the data uploaded is stored. In step 918, methods for synchronizing data in a multi-tenant database environment may be implemented. In another embodiment, although depicted as distinct steps in FIG. 9, steps 902-918 may not be distinct steps. In other embodiments, method 900 may not have all of the above steps and/or may have other steps in addition to, or instead of, those listed above. The steps of method 900 may be performed in another order. Subsets of the steps listed above as part of method 900 may be used to form their own method.

Method for Creating the Environment (FIGS. 7 and 8)

Figure 10:
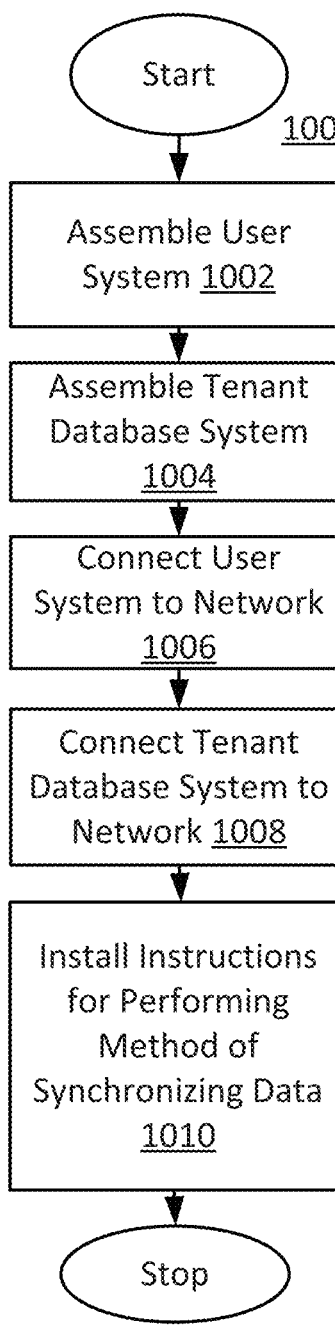
FIG. 10 is a flowchart of an example of a method of making the environment of FIGS. 7 and 8.

FIG. 10 is a method of making environment 710, in step 1002, user system 712 (FIGS. 7 and 8) is assembled, which may include communicatively coupling one or more processors, one or more memory devices, one or more input devices (e.g., one or more mice, keyboards, and/or scanners), one or more output devices (e.g., one more printers, one or more interfaces to networks, and/or one or more monitors) to one another.

In step 1004, system 716 (FIGS. 7 and 8) is assembled, which may include communicatively coupling one or more processors, one or more memory devices, one or more input devices (e.g., one or more mice, keyboards, and/or scanners), one or more output devices (e.g., one more printers, one or more interfaces to networks, and/or one or more monitors) to one another. Additionally assembling system 716 may include installing application platform 718, network interface 720, tenant data storage 722, system data storage 724, system data 725, program code 726, process space 728, UI 830, API 832, PL/SOQL 834, save routine 836, application setup mechanism 838, applications servers $800_1$-$800_N$, system process space 802, tenant process spaces 804, tenant management process space 810, tenant space 812, tenant data 814, and application metadata 816 (FIG. 8).

In step 1006, user system 712 is communicatively coupled to network 714. In step 1008, system 716 is communicatively coupled to network 714 allowing user system 712 and system 716 to communicate with one another (FIG. 8). In step 1010, one or more instructions may be installed in system 716 (e.g., the instructions may be installed on one or more machine readable media, such as computer readable media, therein) and/or system 716 is otherwise configured for performing the steps of methods for synchronizing data in a multi-tenant database environment. For example, as part of step 1010, one or more instructions may be entered into the memory of system 716 for synchronizing data in a multi-tenant database environment.

In another embodiment, although depicted as distinct steps in FIG. 10, steps 1002-1010 may not be distinct steps. In other embodiments, method 1000 may not have all of the above steps and/or may have other steps in addition to, or instead of, those listed above. The steps of method 1000 may be performed in another order. Subsets of the steps listed above as part of method 1000 may be used to form their own method.

Extensions and Alternatives

Each embodiment disclosed herein may be used or otherwise combined with any of the other embodiments disclosed. Any element of any embodiment may be used in any embodiment.

In an embodiment, the initial synchronization logic may be within the save lifecycle of Opportunity object (in saveHook_BeforeWorkflowOnce). In another embodiment, it may be beneficial to decouple the initial synchronization logic from the save process and move the initial synchronization logic into its own function similar to an API Method. Making the initial synchronization logic an API Method may also simplify the API interface.

In an embodiment, QuoteSynchronizerImpl and LineItemHelperImpl may both be implemented as singletons and therefore may be stateless, e.g. none of the methods rely on the state of class variables. There may be instances where making QuoteSynchronizerImpl and LineItemHelperImpl stateful would allow for better caching of objects that have been bulk loaded and when the objects are known to have not been changed. In an embodiment, the caching of objects in the transaction object map may be tasked to the UddDb and thus call UddDb.getEntityObject directly with the assumption that the object may already be in the transaction object map and therefore would not cause an additional database query, i.e. see LineItemHelperImpl.checkLineItemsAreSyncing. In an embodiment, it may be more efficient to implement caching without the use of the UddDb implementation.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A method for synchronizing data in a multi-tenant database environment, the method comprising:
receiving at a host system, a request from a user system to synchronize a first object with a second object, the host system having a processor system including at least one processor and a memory system; and
as a result of the request, synchronizing, by the host system, the first object with the second object by at least
after workflow, if a value stored in a first element of the first object changed, determining, by the processor system, whether a second object is being synchronized to the first object;
if the second object is being synchronized to the first object, updating, by the host system, the second object, such that a second element that corresponds to the first element, but is in the second object, has a value that agrees with the value stored in the first element;

determining, by the host system, whether an error condition occurs; and if the error condition is not detected, saving the updating in the memory system of the host system.

2. The method of claim 1 further comprising updating a price book of the first object with a price book of the second object if both the first object and second object do not have any values stored in the elements, the price book having a list of items, each item having an associated price.

3. The method of claim 1 wherein the synchronizing of the first object and second object includes at least deleting, updating, and inserting elements of the first object to agree with the second object, the deleting of elements includes at least removing data from fields from the first object to match a corresponding empty field from the second object, the inserting of elements includes at least adding data to fields of the first object to match a corresponding field containing data from the second object.

4. The method of claim 1 wherein the first object is an opportunity, the opportunity including at least data associated with selling products to a customer, the opportunity being stored, in a portion of the database dedicated to the tenant.

5. The method of claim 1 wherein the second object is a quote, the quote including at least sales information given to a customer, the quote being stored in a portion of the database dedicated to the tenant.

6. The method of claim 1 wherein the first object is an opportunity and has six or more elements, the elements including at least a quantity, a price, a discount, a service date, a revenue schedule, and a quantity schedule.

7. The method of claim 1 wherein the second object is a quote and has six or more elements, the elements including a quantity, a price, a discount, a service date, a revenue schedule, and a quantity schedule.

8. The method of claim 1 wherein the first object is an opportunity and the second object is a quote, each having at least six elements, the elements including at least a quantity, a price, a discount, a service date, a revenue schedule, and a quantity schedule.

9. The method of claim 1, the first object being an opportunity and the second object being a quote, the method further comprising:

checking whether a field for indicating which quote an opportunity is synchronized with has changed, if the field changed, set settings for opportunities to be unsynchronized from prior synchronizations, by at least determining which opportunities should be synchronized with the quote, setting a field for indicating whether a quote is being synchronized to false, unsetting foreign keys of opportunity line items, the foreign keys pointing to which quote line items the opportunity line items were being synchronized with, and unsetting schedule flags of quote line items;

updating values of settings for opportunities to be synchronized by at least, retrieving a quote that is pointed to by a field for indicating which quote to synchronize an opportunity to, setting the field for indicating whether a quote is being synchronized to true, synchronizing quote elements with opportunity elements that are different, deleting opportunity elements that are to be deleted, synchronizing quote and opportunity price books if there are no elements stored in the first and second object, and inserting opportunity elements if there are any to insert.

10. The method of claim 1 further comprising sending a user interface having a synchronization button to the user system, wherein receiving the request includes at least receiving an indication that the user selected the synchronize button.

11. The method of claim 1, wherein the request is made by designating, via an application programming interface, the first object and second object for synchronization.

12. The method of claim 1, the first object being an opportunity and the second object being a quote, the method further comprising:

keeping the first object and second object continuously synchronized by at least, after performing calculations for rollup summary fields and workflow, when an opportunity price book of the opportunity is different than a quote price book of the quote, and when the opportunity has no line items, synchronizing the opportunity price book with the quote;

when a quote price book of the quote is different than an opportunity price book of the opportunity, and when the opportunity has no line items, synchronizing the quote price book with the opportunity;

when opportunity line items have elements differing from quote line items to which the opportunity line items are being synchronized, updating the opportunity line items to have the same data as the quote line items with differing elements;

when opportunity line items are deleted, synchronizing quote line items by deleting quote line items corresponding to the deleted opportunity line items;

when quote line items are inserted or updated, synchronizing the inserted or updated quote line items;

when quote line items are deleted, synchronizing opportunity line items by deleting opportunity line items corresponding to the deleted quote line items; and when quote line items are undeleted, synchronizing opportunity line items by inserting opportunity line items to match the undeleted line items.

13. The method of claim 1 wherein the error condition is an attempt to perform a second synchronization within a single transaction.

14. The method of claim 13 wherein determining whether the attempt to perform a second synchronization within a single transaction includes at least monitoring for whether an action is updating the parent opportunity of an opportunity line item while a synchronization is already ongoing, monitoring for whether an action is updating a quote line item with data from an opportunity line item while a synchronization is already ongoing, monitoring for whether an action is updating opportunity line item data with itself, monitoring for whether an action is updating quote line item data with itself, monitoring for whether an action is updating opportunity line item data with quote line item data while a synchronization is already ongoing, and monitoring for whether an action is updating quote line item data while a synchronization is already ongoing.

15. A non-transitory machine-readable medium storing thereon one or more instructions, which when implemented cause a processor to implement a method for synchronizing data in a multi-tenant database environment, the method comprising:

receiving at a host system, a request from a user system to synchronize a first object with a second object, the host system having a processor system including at least one processor and a memory system; and as a result of the request, synchronizing, by the host system, the first object with the second object by at least after workflow, if a value stored in a first element of the first object changed, determining, by the processor system, whether a second object is being synchronized to the first object;

if the second object is being synchronized to the first object, updating, by the host system, the second object, such that a second element that corresponds to the first element, but is in the second object, has a value that agrees with the value stored in the first element;

one object of the first object and second object being an opportunity and a second object of the first object and second object being a quote;

an opportunity being a database object that stores information about opportunities for making a sale and a quote being a database object that stores information about quotes to customers interested in a sale.

16. The non-transitory machine readable medium of claim 15, the method further comprising updating a price book of the first object with a price book of the second object if both the first object and second object do not have any values stored in the elements, the price book having a list of items, each item having an associated price.

17. The non-transitory machine readable medium of claim 16, wherein synchronizing of the first object and second object includes at least deleting, updating, and inserting elements of the first object to agree with the second object, the deleting of elements includes at least removing data from fields from the first object to match a corresponding empty field from the second object, the inserting of elements includes at least adding data to fields of the first object to match a corresponding field containing data from the second object.

18. A machine resident host system for synchronizing data in a multi-tenant database environment, the host system comprising:

a processor system, a memory system including at least non-transitory volatile memory, and non-volatile memory;

the non-volatile memory including at least one non-transitory machine readable medium carrying one or more sequences of instructions which when implemented causes the processor system to implement a method comprising:

receiving at a host system, a request from a user system to synchronize a first object with a second object, the host system having a processor system including at least one processor and a memory system; and as a result of the request, synchronizing, by the host system, the first object with the second object by at least after workflow, if a value stored in a first element of the first object changed, determining, by the processor system, whether a second object is being synchronized to the first object;

if the second object is being synchronized to the first object, updating, by the host system, the second object, such that a second element that corresponds to the first element, but is in the second object, has a value that agrees with the value stored in the first element;

one object of the first object and second object being an opportunity and a second object of the first object and second object being a quote;

an opportunity being a database object that stores information about opportunities for making a sale and a quote being a database object that stores information about quotes to customers interested in a sale.

19. The system of claim 18, the method further comprising updating a price book of the first object with a price book of the second object if both the first object and second object do not have any values stored in the elements, the price book having a list of items, each item having an associated price.

20. The system of claim 18, wherein synchronizing of the first object and second object includes at least deleting, updating, and inserting elements of the first object to agree with the second object, the deleting of elements includes at least removing data from fields from the first object to match a corresponding empty field from the second object, the inserting of elements includes at least adding data to fields of the first object to match a corresponding field containing data from the second object.

* * * * *